(12) United States Patent
Onodera et al.

(10) Patent No.: US 12,332,496 B2
(45) Date of Patent: Jun. 17, 2025

(54) LENS DRIVING DEVICE, CAMERA DEVICE AND ELECTRONIC APPARATUS

(71) Applicant: New Shicoh Motor Co., Ltd., Zhejiang (CN)

(72) Inventors: Kei Onodera, Yamato (JP); Tomoyoshi Yano, Yamato (JP); Kazuhiko Naito, Yamato (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 564 days.

(21) Appl. No.: 17/708,667

(22) Filed: Mar. 30, 2022

(65) Prior Publication Data

US 2022/0326471 A1    Oct. 13, 2022

(30) Foreign Application Priority Data

Apr. 9, 2021    (CN) .......................... 202110383285.1

(51) Int. Cl.
    *G02B 7/02*    (2021.01)

(52) U.S. Cl.
    CPC ............. *G02B 7/026* (2013.01); *G02B 7/021* (2013.01)

(58) Field of Classification Search
    CPC ................................ G02B 7/026; G02B 7/021
    USPC .......................................................... 359/818
    See application file for complete search history.

(56) References Cited

FOREIGN PATENT DOCUMENTS

JP            2007049873 A      2/2007

*Primary Examiner* — Wyatt A Stoffa
*Assistant Examiner* — Grant A Gagnon
(74) *Attorney, Agent, or Firm* — Hayes Soloway PC

(57) ABSTRACT

A lens driving device includes a lens holding portion, a driving shaft, a vibration member, and a spring member. The vibration member is connected to one end of the driving shaft and causes the driving shaft to micro-vibrate. The spring member is fixed to the lens holding portion and includes a grip portion that sandwiches and grasps the driving shaft. Extension piece portions that protrude while being bent so as to be separated from the driving shaft are provided at end sides of the grip portion in an axial direction of the driving shaft.

5 Claims, 7 Drawing Sheets

LENS DRIVING DEVICE, CAMERA DEVICE AND ELECTRONIC APPARATUS

CROSS-REFERENCE TO RELATED APPLICATIONS

This application claims the benefit of Chinese Patent Application No. 202110383285.1 filed Apr. 9, 2021, which is hereby incorporated by reference herein in its entirety.

TECHNICAL FIELD

The present disclosure relates to a lens driving device used in electronic apparatus such as smartphones, a camera device and an electronic apparatus.

BACKGROUND

In some camera devices with a zoom function, a piezoelectric element is used as a driving source of a movable body that holds a lens body. As a document disclosing a technique related to this type of camera device, Japanese Patent Application Laid-Open No. 2007-49873 (hereinafter referred to as "Patent Document 1") can be given. The camera device described in Patent Document 1 has a first movable lens body and a second movable lens body, and two actuators driving the first movable lens body and the second movable lens body, respectively, are symmetrically arranged on one side and the other side sandwiching the optical axis of the lens body. The actuator of the camera device is configured by a fixed frame, a piezoelectric element, a driving shaft, a coupling piece, and a mounting fitting. A V-shape first sliding member, as well as a V-shape second sliding member, and a presser spring obtained by bending a metal plate are provided at the connecting portion between the coupling piece of the actuator and the driving shaft, and the driving shaft is pinched by the urging force of the presser spring. When a driving pulse is applied to the piezoelectric element at the base end of the driving shaft of the actuator, the driving shaft microvibrates asymmetrically in a reciprocating manner in the axial direction, and the lens holding portion supported by the driving shaft moves in the light axial direction.

SUMMARY

However, as in Patent Document 1, when the driving shaft is configured to be held by elastic force and frictional force, there is a problem that scrapes may occur due to the scratching of the driving shaft and the lens holding portion. For example, when the device is assembled, when the driving shaft is inserted into the lens holding portion, the driving shaft is damaged, and when the driving shaft is driven, dust or foreign matter is generated due to the sliding between the peripheral surface of driving shaft and the holding surface of the lens holding portion.

The present disclosure has been made in view of such problem, and the present disclosure aims to provide a lens driving device, a camera device, and an electronic apparatus capable of suppressing the occurrence of scrapes due to the scratching of the driving shaft and the lens holding portion.

To achieve the above-described object, in accordance with a first aspect of the present disclosure, there is provided a lens driving device including: a lens holding portion; a driving shaft; a vibration member that is connected to one end of the driving shaft and causes the driving shaft to micro-vibrate; and a spring member fixed to the lens holding portion and having a grip portion that sandwiches and grasps the driving shaft, wherein extension piece portions that protrude while being bent so as to be separated from the driving shaft are provided at end sides of the grip portion in an axial direction of the driving shaft.

In accordance with a second aspect of the present disclosure, there is provided a camera device including the lens driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
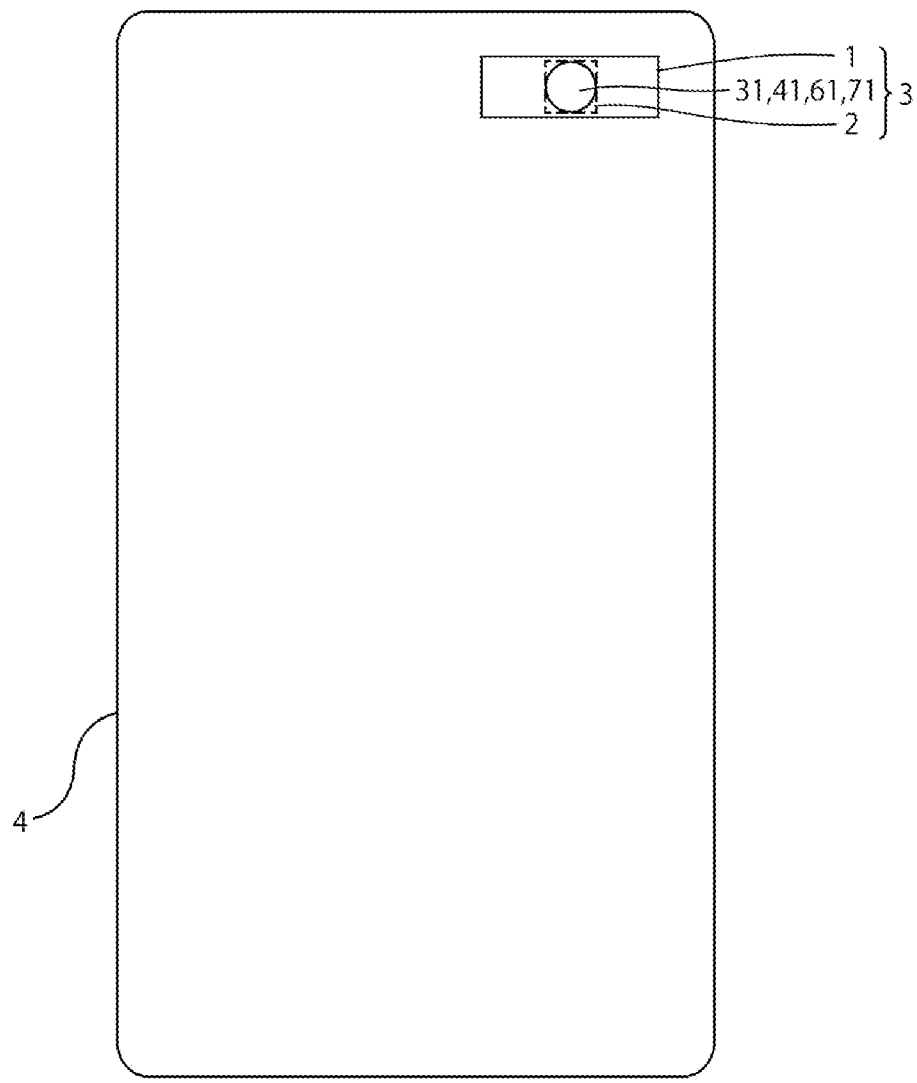
FIG. 1 is a front view of a smartphone on which a camera device including a lens driving device according to one embodiment of the present disclosure is mounted.

Hereinafter, embodiments of the present disclosure are explained with reference to drawings. As shown in FIG. 1, a camera device 3 including a lens driving device 1 according to one embodiment of the present disclosure is accommodated in a smartphone 4.

Figure 3:
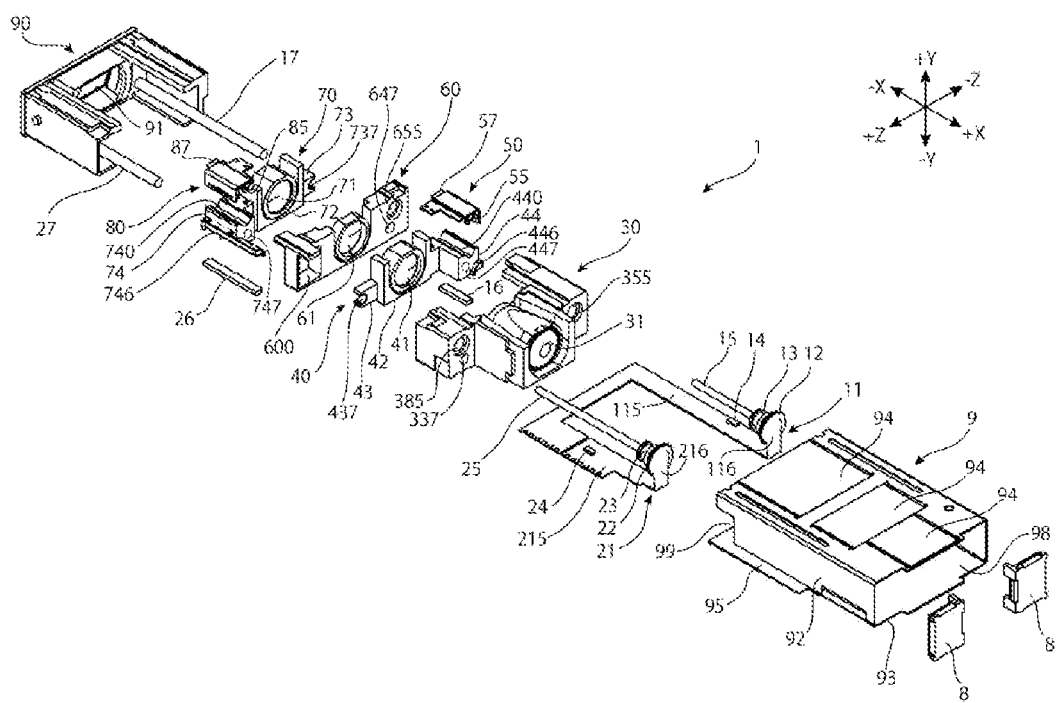
FIG. 3 is an exploded perspective view of the lens driving device shown in FIG. 2.

As shown in FIG. 3, the camera device 3 includes: a first fixed lens body 31, a first movable lens body 41, a second fixed lens body 61, and a second movable lens body 71; an image sensor 2 (see FIG. 1) converting light incident through them into an image signal; and a lens driving device 1 holding the first fixed lens body 31, the first movable lens body 41, the second fixed lens body 61, the second movable lens body 71, and image sensor 2, and driving the first movable lens body 41 and the second movable lens body 71 with respect to the image sensor 2. The first fixed lens body 31, the first movable lens body 41, the second fixed lens body 61, and the second movable lens body 71 are arranged so that the respective optical axes coincide with each other.

Hereinafter, as shown in FIG. 2 through FIG. 6, the direction in which the light from the subject is incident is appropriately referred to as an X direction, one direction orthogonal to the X direction is appropriately referred to as an Y direction, and a direction orthogonal to both the X direction and the Y direction is appropriately referred to as a Z direction. The X direction is an optical axis direction. Further, the +X side of the optical axis direction which is the side of the subject, may be referred to as a front side, and the −X side, which is the side on which the image sensor 2 on the opposite side of the subject is provided, may be referred to to as a rear side. Further, the +Z side may be referred to as a left side, the −Z side may be referred to as a right side, the +Y side may be referred to as an upper side, and the −Y side may be referred to as a lower side.

As shown in FIG. 3, the lens driving device 1 includes a square lid 8, a case 9, a first FPC (flexible printed circuit board) 11, a second FPC (flexible printed circuit board) 21, a first vibration member 12, a second vibration member 22, a rubber bush 13, a rubber bush 23, a first driving shaft 15, a second driving shaft 25, a first position sensor 14, a second position sensor 24, a first position detecting magnet 16, a second position detecting magnet 26, a first guide shaft 17, a second guide shaft 27, a first spring member 50, a second spring member 80, a first fixed lens holding portion 30, a first movable lens holding portion 40, a second fixed lens holding portion 60, a second movable lens holding portion 70, and a base 90.

The case 9 is in a hollow box shape with the front side and the rear side opened. A square lid 8 is fitted into the open portion 98 of the case 9 on the front side. A base 90 is fitted into the open portion 99 of the case 9 on the rear side. Three cover plates 94 are arranged on the upper plate of the case 9 side by side in the optical axis direction.

The base 90 has a rectangular rear plate, and an upper side plate, a lower side plate, a left side plate and a right side plate that are erected forward from the peripheral edge portion of the rear plate. The upper side plate and the lower side plate are not formed at the central portion in the +Y and −Y direction in FIG. 3. The front end surfaces of the upper side plate, the lower side plate, the left side plate and the right side plate are formed flat, and the rear surface of the second fixed lens holding portion 70 described later is mounted and fixed. The front surface of the second fixed lens holding portion 70 is formed flat, and the rear surface of the first fixed lens holding portion 30 described later is mounted and fixed.

A through hole 91 is provided in the center of the base 90 in FIG. 3. The image sensor 2 (not shown) is fixed on the rear surface of the rear plate of the base 90 with its light receiving surface facing the through hole 91 side. In FIG. 3, the rear ends of the first guide shaft 17 and the second guide shaft 27 are fixed on the right side and the left side of the through hole 91 in the front surface of the base 90. The length of the second guide shaft 27 is shorter than the length of the first guide shaft 17.

Figure 2:
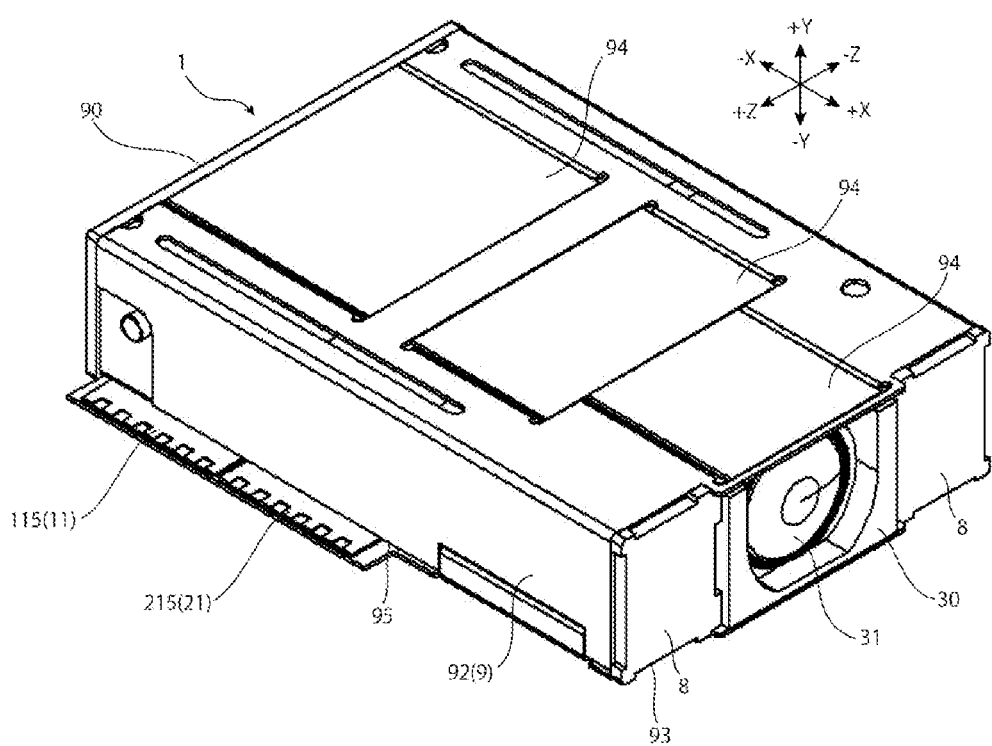
FIG. 2 is a perspective view of the lens driving device shown in FIG. 1.

The first FPC 11 and the second FPC 21 are arranged along the upper surface of the lower plate 93 of the case 9. The first FPC 11 has a flat plate portion 115 and a pad portion 116 rising from one end portion of the flat plate portion 115. The second FPC 21 has a flat plate portion 215 and a pad portion 216 rising from one end portion of the flat plate portion 215. As shown in FIG. 2, the flat plate portion 115 and the flat plate portion 215 are exposed to the outside from the gap 95 between the lower plate 93 and the side plate 92 on the right side of the case 9.

Figure 5:
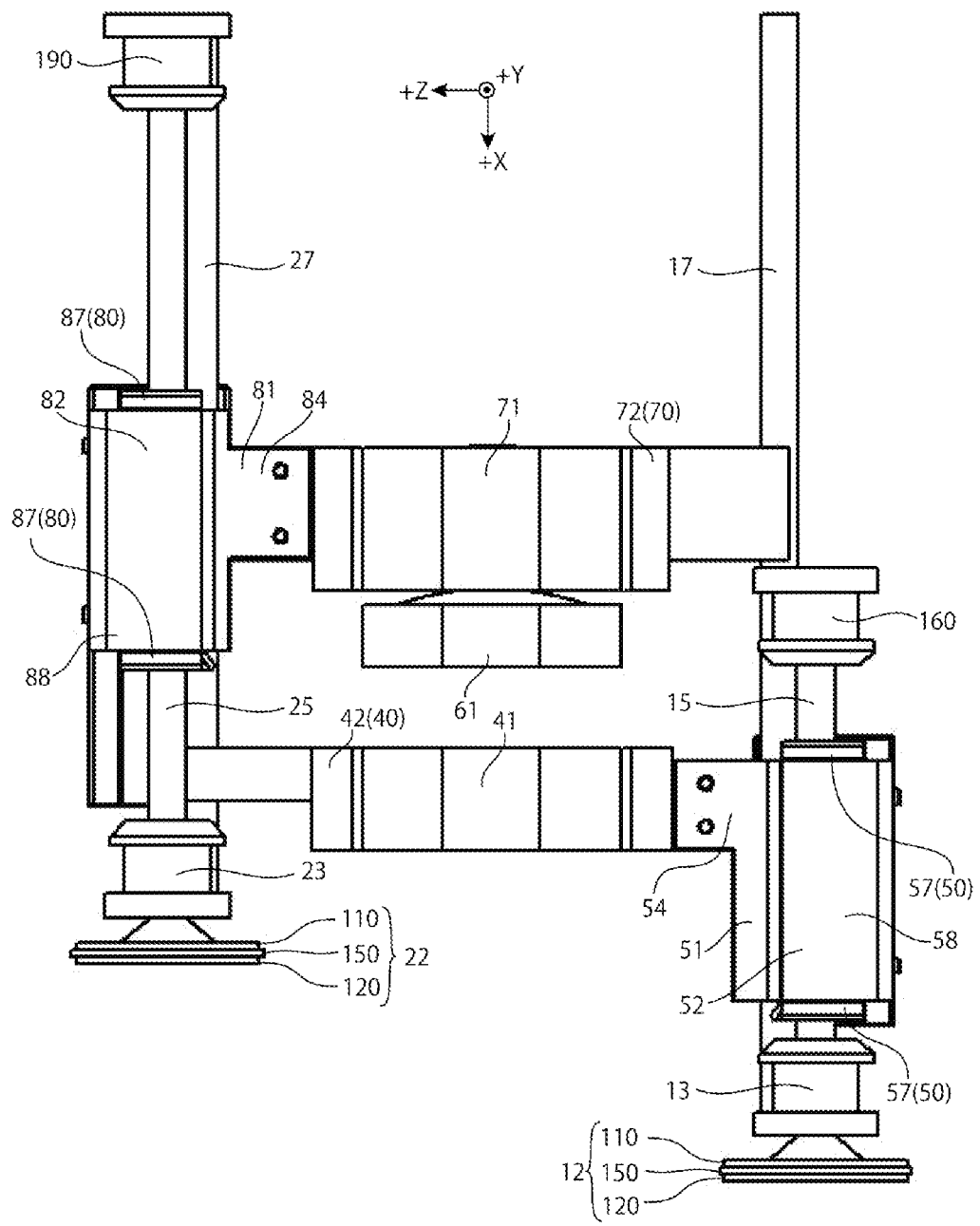
FIG. 5 is a diagram of a main portion of the lens driving device shown in FIG. 2 as viewed from the +Y side.
Figure 6:
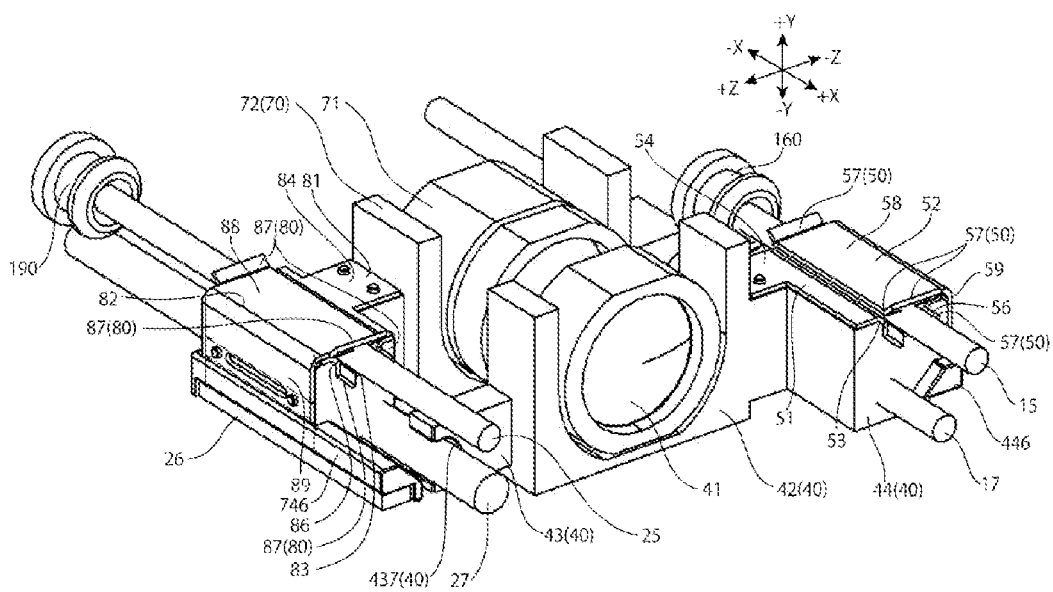
FIG. 6 is a perspective view of the main portion of the lens driving device shown in FIG. 2.

As shown in FIG. 3, the first vibration member 12 is fixed to the pad portion 116. The second vibration member 22 is fixed to the pad portion 216. As shown in FIG. 5, the first vibration member 12 and the second vibration member 22 are formed by laminating a piezoelectric element 110, an elastic thin plate 150, and a piezoelectric element 120.

The front end of the first driving shaft 15 is adhesively fixed to the first vibration member 12. In addition, the rubber bush 13 is fitted into a round hole 355 (see FIG. 3) of the first fixed lens holding portion 30, and the rubber bush 160 (see FIG. 5) is fitted into a round hole 655 (see FIG. 3) of the second fixed lens holding portion 60. The first driving shaft 15 is fitted into the center hole of the rubber bushes 13, 160 and is coupled to the fixed portion of the lens driving device 1 via the rubber bushes 13, 160. The front end of the second driving shaft 25 is adhesively fixed to the second vibration member 22. In addition, the rubber bush 23 is fitted into a round hole 385 (see FIG. 3) of the first fixed lens holding portion 30, and the rubber bush 190 (see FIG. 5) is fitted into a round hole (not shown) of the base 90. The second driving shaft 25 is fitted into the center holes of the rubber bush 23, 190 and is coupled to the fixed portion of the lens driving device 1 via the rubber bushes 23, 190. The length of the second driving shaft 25 is longer than the length of the first driving shaft 15.

In FIG. 3, the first fixed lens holding portion 30, the first movable lens holding portion 40, the second fixed lens holding portion 60, and the second movable lens holding portion 70 are arranged in order from the front side in the case 9. The first fixed lens holding portion 30 and the first fixed lens body 31 held by the first fixed lens holding portion 30 are exposed to the front side from between the two square lids 8 in the open portion 98 of the case 9.

The first fixed lens holding portion 30 is a member that holds the first fixed lens body 31. The first movable lens holding portion 40 is a member that holds the first movable lens body 41. The second fixed lens holding portion 60 is a member that holds the second fixed lens body 61. The second movable lens holding portion 70 is a member that holds the second movable lens body 71.

Among these, the first fixed lens holding portion 30 and the second fixed lens holding portion 60 are fixed to the inner surface of the case 9. As shown in FIG. 5, the first movable lens holding portion 40 is supported movably in the X direction by the first driving shaft 15, the first guide shaft 17, and the second guide shaft 27. The second movable lens holding portion 70 is supported movably in the X direction by the second driving shaft 25, the first guide shaft 17, and the second guide shaft 27.

As shown in FIG. 3, the first fixed lens holding portion 30 includes a middle member having a U-shaped groove opened on the upper side, a left protruding portion protruding from the left surface of the middle member, and a right protruding portion protruding from the right surface of the middle member. The round hole 355 and the round hole (not shown) penetrate the right protruding portion in the X direction. The round hole 337 and the round hole 385 penetrate the left protruding portion in the X direction. The round hole 355 is larger than the round hole (not shown) and is provided on the upper side, and the round hole 385 is larger than the round hole 337 and is provided on the upper side.

The second fixed lens holding portion 60 has a U-shaped groove opened on the upper side in the center in FIG. 3, a round hole 647 and a round hole 655 penetrating in the X direction on the right side, and a square hole 600 penetrating in the X direction on the left side. The round hole 655 is larger than the round hole 647 and is provided on the upper side. The square hole 600 is formed in a size that does not come into contact with the second driving shaft 25 and the second guide shaft 27.

Figure 4:
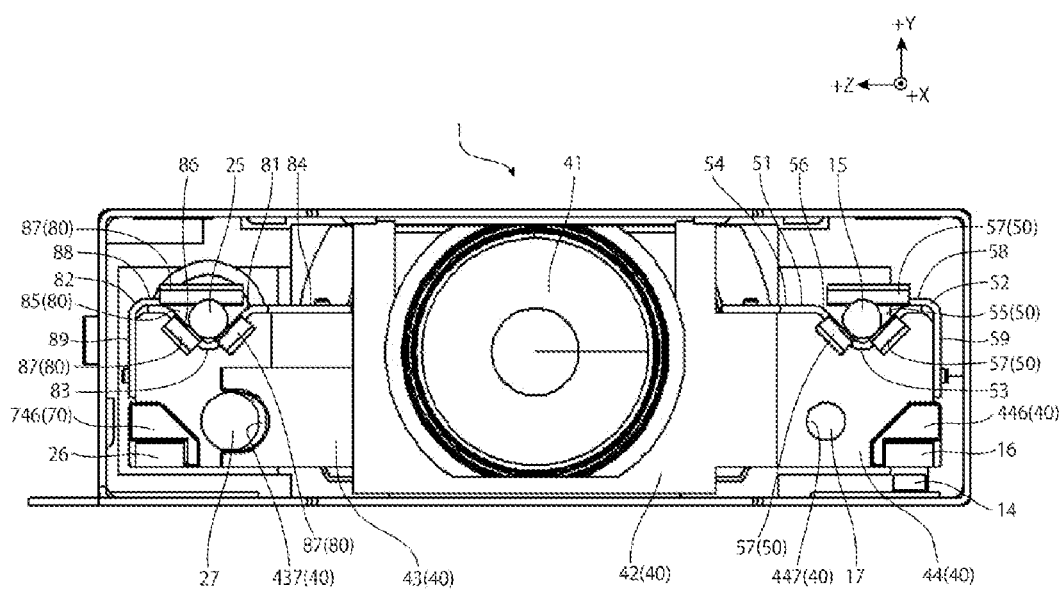
FIG. 4 is a cross-sectional view of a cross-sectional plane passing through between the first fixed lens holding portion and the first movable lens holding portion of the lens driving device shown in FIG. 2 as viewed from the +X side.
Figure 7:
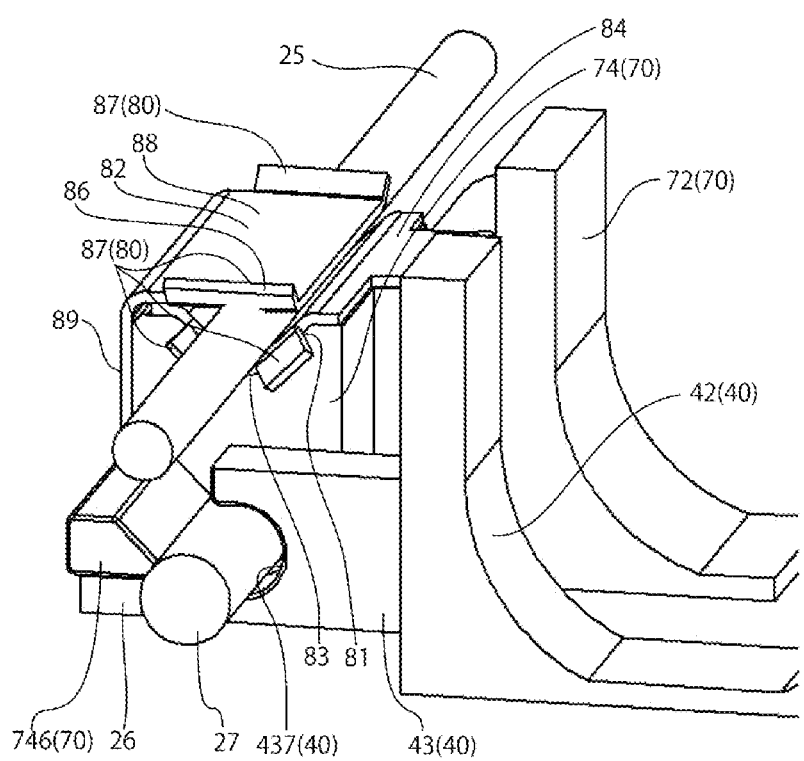
FIG. 7 is a perspective view of a portion on the +Z side of the main portion of the lens driving device shown in FIG. 2 as viewed from another direction.

The first movable lens holding portion 40 includes a middle member 42 having a U-shaped groove opened on the upper side in FIG. 4, an arm portion 43 protruding from the left surface of the middle member 42, and a supporting table portion 44 protruding from the right surface of the middle member 42. The first movable lens body 41 is accommodated and held in the groove of the middle member 42. A U-shaped sliding groove 437 opened on the left side is provided at the tip end of the arm portion 43. The sliding groove 437 has a width in up and down direction approximately the same as the diameter of the second guide shaft 27 as shown in FIGS. 4 and 7, extends in the X direction, and the second guide shaft 27 is inserted therethrough.

As shown in FIGS. 3 and 4, the supporting table portion 44 is in an approximately rectangular parallelepiped shape. The supporting table portion 44 is provided with a round hole 447. The round hole 447 has the same diameter as the diameter of the first guide shaft 17 and penetrates the supporting table portion 44 in the X direction, and the first guide shaft 17 is inserted therethrough. A V-shaped groove 440 (see FIG. 3) is provided on the upper surface of the supporting table portion 44. The V-shaped groove 440 extends in the X direction. An accommodation portion 446 for accommodating the first position detecting magnet 16 is provided on the lower surface of the supporting table portion 44. The first position detecting magnet 16 is accommodated in and fixed to the accommodation portion 446. The first position sensor 14 is fixed at a position on the first FPC11 opposite to the first position detecting magnet 16. The first position sensor 14 detects the magnetic field from the first position detecting magnet 16 and outputs the signal showing the detection result.

The first spring member 50 is fixed to the supporting table portion 44. The first spring member 50 has a V spring 51 and an L spring 52 (see FIG. 4). The V spring 51 is formed in a V-shape by two flat surfaces, has a V portion 53 accommodated in the V-shaped groove 440 and a flat surface portion 54 placed on the upper surface of the supporting table portion 44, and is fixed to the supporting table portion 44. The L spring 52 has an L-shape, and the other flat surface portion 59 is fixed to the left surface of the supporting table portion 44 so that one flat surface portion 58 faces the opened portion of the V portion 53 of the V spring 51. The first spring member 50 is fixed to the supporting table portion 44 to constitute a grip portion 56 that grasps the first driving shaft 15 by the V portion 53 of the V spring 51 and the flat surface portion 58 of the L spring 52, and a triangular gap 55 into which the first driving shaft 15 is inserted is formed.

When the first driving shaft 15 is inserted, the two flat surface portions of the V portion 53 and the flat surface portion 58 come into a state of abutting against the first driving shaft 15, and the flat surface portion 58 presses the first driving shaft 15 toward the V portion 53 by the spring force. In the axial direction of the first driving shaft 15, extension piece portions 57 are respectively provided at the two flat surface portions of the V portion 53 and the end sides on the front side and the rear side of the flat surface portion 58 as shown in FIG. 4. The extension piece portion 57 protrudes forward or rearward while being bent so as to be separated from the first driving shaft 15. The proximal end portion of the extension piece portion 57 includes a portion at least touching against the first driving shaft 15. Therefore, when viewed along this abutting portion, the two flat surface portions of the V portion 53 and the flat surface portion 58 touch against the first driving shaft 15, but the extension piece portions 57 are gradually separated when reaching the proximal end portions of the extension piece portions 57. The degree of bending of the extension piece portion 57 may be slight, and particularly, it is desirable to implement it to such an extent that the proximal end portion is not cracked.

The second movable lens holding portion 70 includes a middle member 72 having a U-shaped groove opened on the upper side, an arm portion 73 protruding from the right surface of the middle member 72, and a supporting table portion 74 protruding from the left surface of the middle member 72, as shown in FIGS. 3 and 7. The second movable lens body 71 is accommodated and held in the groove of the middle member 72. A U-shaped sliding groove 737 opened on the right side is provided at the tip end of the arm portion 73. The sliding groove 737 has a width in up and down direction approximately the same as the diameter of the first guide shaft 17, extends in the X direction, and the first guide shaft 17 is inserted therethrough. Since the second movable lens body 71 is heavier than the first movable lens body 41, the second movable lens holding portion 70 is also heavier than the first movable lens holding portion 40.

The supporting table portion 74 is in an approximately rectangular parallelepiped shape. As shown in FIG. 3, the supporting table portion 74 is provided with a round hole 747. The round hole 747 has the same diameter as the diameter of the second guide shaft 27 and penetrates the supporting table portion 74 in the X direction, and the second guide shaft 27 is inserted therethrough. A V-shaped groove 740 is provided on the upper surface of the supporting table portion 74. The V-shaped groove 740 extends in the X direction. As shown in FIG. 4, an accommodation portion 746 for accommodating the second position detecting magnet 26 is provided on the lower surface of the supporting table portion 74. The second position detecting magnet 26 is accommodated in and fixed to the accommodation portion 746. The second position sensor 24 (see FIG. 3) is fixed at a position on the second FPC21 opposite to the second position detecting magnet 26. The second position sensor 24 detects the magnetic field from the second position detecting magnet 26 and outputs the signal showing the detection result.

As shown in FIG. 4, the second spring member 80 is fixed to the supporting table portion 74. The second spring member 80 has a V spring 81 and an L spring 82. The V spring 81 is formed in a V-shape by two flat surfaces, has a V portion 83 accommodated in the V-shaped groove 740 and a flat surface portion 84 placed on the upper surface of the supporting table portion 74, and is fixed to the supporting table portion 74. In FIG. 4, the L spring 82 has an L-shape, and the other flat surface portion 89 is fixed to the left surface of the supporting table portion 74 so that one flat surface portion 88 faces the opened portion of the V portion 83 of the V spring 81. The second spring member 80 is fixed to the supporting table portion 74 to constitute a grip portion 86 that grasps the second driving shaft 25 by the V portion 83 of the V spring 81 and the flat surface portion 88 of the L spring 82, and a triangular gap 85 into which the second driving shaft 25 is inserted is formed.

When the second driving shaft 25 is inserted, the two flat surface portions of the V portion 83 and the flat surface portion 88 come into a state of touching against the second driving shaft 25, and the flat surface portion 88 presses the second driving shaft 25 toward the V portion 83 by the spring force. As shown in FIG. 4, extension piece portions 87 are respectively provided at the two flat surface portions of the V portion 83 and the end sides on the front side and the rear side of the flat surface portion 88. The extension piece portion 87 protrudes forward or rearward while being bent so as to be separated from the second driving shaft 25. The proximal end portion of the extension piece portion 87 includes a portion at least touching against the second driving shaft 25. Therefore, when viewed along this abutting portion, the two flat surface portions of the V portion 83 and the flat surface portion 88 touch against the second driving shaft 25, but the extension piece portions 87 are gradually separated when reaching the proximal end portions of the extension piece portions 87. The degree of bending of the extension piece portion 87 may be slight, and particularly, it is desirable to implement it to such an extent that the proximal end portion is not cracked.

As shown in FIGS. 3 and 4, the first driving shaft 15 is passed through the round hole 355 of the first fixed lens holding portion 30, the gap 55 of the first spring member 50 fixed to the first movable lens holding portion 40, and the round hole 655 of the second fixed lens holding portion 60. As shown in FIG. 5, the front end of the first driving shaft 15 fixes the first vibration member 12. A portion near the front end of the first driving shaft 15 is connected to the round hole 355 of the first fixed lens holding portion 30 via the rubber bush 13. The rear end of the first driving shaft 15 is connected to the round hole 655 of the second fixed lens holding portion 60 via the rubber bush 160. The first driving shaft 15 is sandwiched by the first spring members 50 and pressed from the outside. Thereby, the two flat surface portions of the V portion 53 and the inner surface of the flat surface portion 58 of the first spring member 50 are frictionally engaged with the outer peripheral surface of the first driving shaft 15, and the first movable lens holding portion 40 is held by the first driving shaft 15.

As shown in FIGS. 3 and 4, the second driving shaft 25 is passed through the round hole 385 of the first fixed lens holding portion 30, the square hole 600 of the second fixed lens holding portion 60, the gap 85 of the second spring member 80 fixed to the second movable lens holding portion 70, and the round hole (not shown) of the base 90. The front end of the second driving shaft 25 fixes the second vibration member 22 as shown in FIG. 5. A portion near the front end of the second driving shaft 25 is connected to the round hole 385 of the first fixed lens holding portion 30 via the rubber bush 23. The rear end of the second driving shaft 25 is connected to a round hole (not shown) of the base 90 via the rubber bush 190. The second driving shaft 25 is sandwiched by the second spring members 80 and pressed from the outside. Thereby, the two flat surface portions of the V portion 83 and the inner surface of the flat surface portion 88 of the second spring member 80 are frictionally engaged with the outer peripheral surface of the second driving shaft 25, and the second movable lens holding portion 70 is held by the second driving shaft 25.

The first guide shaft 17 is firmly fixed to the rear side wall of the base 90, passed through the sliding groove 737 of the second movable lens holding portion 70, the round hole 647 of the second fixed lens holding portion 60, and the round hole 447 of the first movable lens holding portion 40, and firmly fixed by the round hole 647 and the round hole 447 (see FIG. 3). In the round hole 447, there is almost no gap between the first guide shaft 17 and the first movable lens holding portion 40. Thereby, the first guide shaft 17 guides the first movable lens holding portion 40 so as to smoothly move in the X direction while maintaining a predetermined posture. The first guide shaft 17 is provided almost in contact with the upper and lower inner surfaces of the sliding groove 737 of the second movable lens holding portion 70 to prevent the second movable lens holding portion 70 from rotating around the second guide shaft 27.

The second guide shaft 27 is firmly fixed to the rear side wall of the base 90, passed through the round hole 747 of the second movable lens holding portion 70, the square hole 600 of the second fixed lens holding portion 60, the sliding groove 437 of the first movable lens holding portion 40, and the round hole 337 of the first fixed lens holding portion 30, and firmly fixed by the round hole 337 (see FIG. 3). The second guide shaft 27 is thicker than the first guide shaft 17. In the round hole 747, there is almost no gap between the second guide shaft 27 and the second movable lens holding portion 70. Thereby, the second guide shaft 27 guides the second movable lens holding portion 70 so as to smoothly move in the X direction while maintaining a predetermined posture. The second guide shaft 27 is provided almost in contact with the upper and lower inner surfaces of the sliding groove 437 of the first movable lens holding portion 40 to prevent the first movable lens holding portion 40 from rotating around the first guide shaft 17.

When a predetermined pulse voltage is repeatedly applied to the first vibration member 12 from the first FPC11, the first vibration member 12 is finely deformed, and accordingly, the first driving shaft 15 repeats a fine reciprocating asymmetric movement in the X direction. For example, the first movable lens holding portion 40 follows and moves when the first driving shaft 15 moves at a low speed in the +X direction, and stays at the position without following when the first driving shaft 15 moves at a high speed in the −X direction, thereby moving slightly in the +X direction. The movement is repeated and the first movable lens holding portion 40 moves intermittently in the +X direction. When an opposite pulse voltage is applied, the first movable lens holding portion 40 moves intermittently in the −X direction.

When a predetermined pulse voltage is repeatedly applied to the second vibration member 22 from the second FPC21, the second vibration member 22 is finely deformed, and accordingly, the second driving shaft 25 repeats a fine reciprocating asymmetric movement in the X direction. For example, the second movable lens holding portion 70 follows and moves when the second driving shaft 25 moves at a low speed in the +X direction, and stays at the position without following when the second driving shaft 25 moves at a high speed in the −X direction, thereby moving slightly in the +X direction. The movement is repeated and the second movable lens holding portion 70 moves intermittently in the +X direction. When an opposite pulse voltage is applied, the second movable lens holding portion 70 moves intermittently in the −X direction.

Here, the second movable lens body 71 is thicker than the first movable lens body 41, accordingly. The dimension of the second movable lens holding portion 70 in the front-rear direction is larger than that of the first movable lens holding portion 40. Therefore, the combined weight of the second movable lens body 71 and the second movable lens holding portion 70 as the movable body is heavier than the combined weight of the first movable lens body 41 and the first movable lens holding portion 40. Thus, the load applied to the second guide shaft 27 is larger than the load applied to the first guide shaft 17 and the smooth movement while maintaining the predetermined posture is likely to be hindered. However, by making the second guide shaft 27 thicker than the first guide shaft 17, it is possible to ensure smooth movement while maintaining a predetermined posture.

Each lens body of the first fixed lens body 31, the first movable lens body 41, the second fixed lens body 61, and the second movable lens body 71 can be arranged in the U-shaped groove opened on the upper side of each corresponding lens holding portion from the opening provided in the upper plate of the case 9 after each corresponding lens holding portion is arranged inside the case 9, together with each driving shaft, each guide shaft. After arrangement, the opening is blocked by the cover plate 94.

The above is the details of the present embodiment. The lens driving device 1 according to the present embodiment includes lens holding portions 40, 70; driving shafts 15, 25; vibration members 12, 22 that are connected to one ends of the driving shafts 15, 25 and cause the driving shafts 15, 25 to micro-vibrate; and spring members 50, 80 fixed to the lens holding portions 40, 70 and having grip portions 56, 86 that sandwich and grasp the driving shafts 15, 25. Extension piece portions 57, 87 that protrude while being bent so as to be separated from the driving shafts 15, 25 are provided at the end sides of the grip portions 56, 86 in the axial direction of the driving shafts 15, 25 Thus, it is possible to provide a lens driving device 1 in which even if the end sides of the grip portions 56, 86 move, they are hardly bitten into the driving shafts 15,25, and the scrapes of the driving shafts 15, 25 or the grip portions 56, 86 caused thereby can be suppressed. For example, it is possible to prevent the scrapes of the driving shafts 15, 25 when the driving shafts 15, 25 are inserted into the lens holding portions 40, 70, and to suppress the generation of dust foreign matter when the driving shafts 15, 25 are driven.

It is to be noted that, in the present embodiment, the extension piece portions 57, 87 may be provided only at the end sides of one of the +X side and the −X side of the grip portions 56, 86 of the spring members 50, 80. Further, the extension piece portions 57, 87 may be provided only at the end sides of the grip portions 56, 86 of one of the spring member 50 and the spring member 80. Further, for example, the extension piece portions 57, 87 may be provided only at two end sides or one end side of the three end sides on the +X side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens driving device, comprising:
   a lens holding portion having a supporting table portion;
   a driving shaft;
   a vibration member that is connected to one end of the driving shaft and causes the driving shaft to micro-vibrate; and
   a spring member comprising a V spring and an L spring, the spring member fixed to the supporting table portion of the lens holding portion and comprising a grip portion that sandwiches and grasps the driving shaft, the grip portion having a gap into which the driving shaft inserted is formed, constituted by a V portion of the V spring and a flat surface portion of the L spring, and
   wherein a first extension piece portion provided at one end portion of the flat surface portion of the L spring abutting against the driving shaft along an axial direction of the driving shaft protrudes toward the vibration member while bent to separate from the driving shaft, and a second extension piece portion provided at an other end portion of the flat surface portion of the L spring abutting against the driving shaft along the axial direction of the driving shaft protrudes away from the vibration member while bent to separate from the driving shaft.

2. The lens driving device according to claim 1, wherein the spring member is in contact with the driving shaft through at least three sides when viewed from the axial direction of the driving shaft, and the extension piece portions are provided at the end portions of the V portion of the V spring, respectively.

3. The lens driving device according claim 1, wherein the lens holding portion is provided with a V-shaped groove parallel to a moving direction of the lens holding portion, and the V portion is accommodated in the V-shaped groove.

4. A camera device comprising the lens driving device of claim 1.

5. An electronic apparatus comprising the camera device of claim 4.

* * * * *